June 3, 1969   H. D. TANZMAN   3,447,370
ATMOSPHERIC MEASURING SYSTEM
Filed April 10, 1967
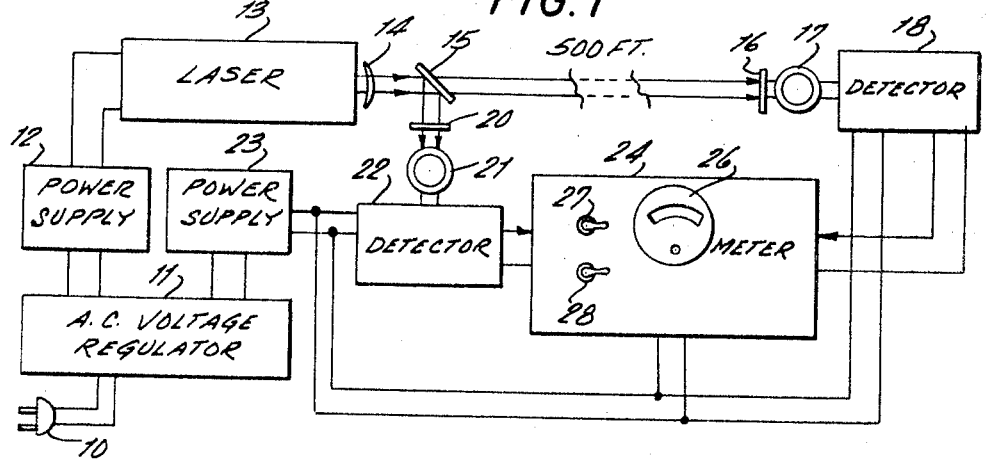
FIG. 1
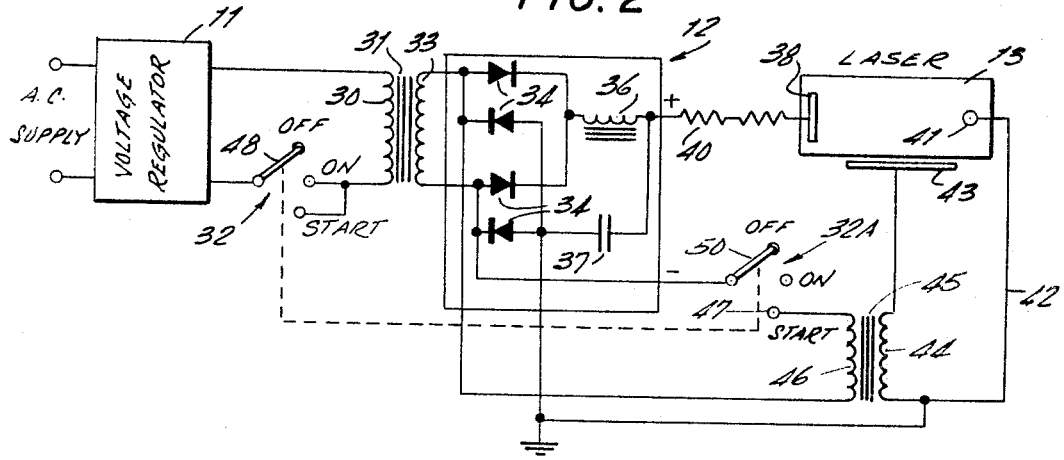
FIG. 2
FIG. 3
INVENTOR.
HERBERT D. TANZMAN
BY Albert F. Kronman
ATTORNEY

United States Patent Office 3,447,370
Patented June 3, 1969

3,447,370
ATMOSPHERIC MEASURING SYSTEM
Herbert D. Tanzman, Elberon, N.J., assignor to Winslow Tele-Tronics, Inc., Asbury Park, N.J., a corporation of Pennsylvania
Filed Apr. 10, 1967, Ser. No. 629,634
Int. Cl. G01w 1/00
U.S. Cl. 73—170                 8 Claims

ABSTRACT OF THE DISCLOSURE

A measuring system for determining the amount of fog or smoke in the air is described. The device uses a laser light beam which generates a concentrated beam of light having a wave length which is substantially monochromic. The wave length chosen (6328 A.) lies within the red portion of the spectrum and monopass filters are used so that all the ambient light, including sunlight, is blocked from the detecting systems. The laser light generator is connected to a regulated power source and its beam traverses about 500 feet to a first detector which generates a direct current voltage. A similar detector is set up near the source and derives its light input from a beam splitter positioned in the path of the laser beam. Switching means are provided for determining the percentage of light lost in transit through the atmosphere.

Background of the invention

Many systems have been devised for measuring the light transmission through an extended path in the atmosphere, generally from one tall building or tower to another. Most of these prior systems have been unreliable because they have been affected to a material extent by ambient light, whether from the sun light or from artificial illumination, from other structures.

Summary of the invention

This invention relates to a means for determining the amount of loss in transmission of light through an atmosphere. The measuring system is useful in measuring fog, smoke, and other forms of air pollution. One of the features of the invention includes a switching means and electrical adjustments for first calibrating the system and then for determining directly the percentage loss of light in the atmosphere. The present system employs a laser light generator which produces an intense beam of light in the deep red portion of the spectrum. A first detector, shielded by a monopass filter, is positioned about 500 feet from the laser generator. A second and similar detector, also protected by a monopass filter, is placed adjacent to the generator with means for illuminating a photosensitive transducer by a beam splitter reflector. The device is not affected by ambient illumination because of the deep red color of the filters and because of the directive quality of the light generator. Switching means are arranged for first setting the output meter at a maximum reading designating a clear visual path, and then switching to a measuring circuit which includes both detectors and a regulated voltage source to determine the percentage of light transmission.

In the following description, the term laser denotes a light amplifier which generates its light beam by emission from a light pump surrounding a solid crystal such as a ruby or around a tube filled with gas such as helium-neon. Both gas and ruby lasers are well known in the art and have been described in books and other printed publications.

Brief description of the drawings

FIGURE 1 is a circuit diagram of the entire system showing the power supplies, the two detectors, and the measuring system.

FIGURE 2 is a circuit diagram showing one of the power supply circuits which furnish power to the laser generator.

FIGURE 3 is a circuit diagram showing the details of the two detectors and the switching system which is used for calibrating and reading.

Description of preferred embodiment

Referring now to FIGURE 1, the system may be powered from an electric power supply furnishing alternating current at about 117 volts. A plug 10 is plugged into a wall socket or other suitable power source and the power is first applied to an alternating current voltage regulator 11. This voltage regulator 11 may be any one of the well known types generally used for supplying measuring circuits. It should regulate the voltage for all normal loads at a specified output voltage within a maximum range of ±0.1%. A first power supply 12 is connected to the regulator 11 and supplies power to a laser generator 13. Details of the power supply are shown in FIGURE 2. The laser 13 generates an intense beam of light which may be focused by a lens system 14, then directed through a beam splitter 15 which may consist of a plain sheet of glass with or without a very thin coating of silver on its front face. The laser light beam is then directed to an interference monopass filter 16, a photosensitive transducer 17, and into a first detector 18. The portion of the light reflected by the beam splitter 15 is directed to a second monopass filter 20, a second photosensitive transducer 21, and a second detector 22.

The first and second detectors 18 and 22 receive power from a second power supply 23 and the output of the two detectors is applied to a measuring circuit 24. The measuring circuit includes a direct current amplifier 25, shown in block form in FIGURE 3, an output meter 26 connected to the output of the amplifier 25, and two toggle switches 27 and 28 whose connections are also shown in FIGURE 3.

Referring now to FIGURE 2, the first power supply 12 is shown in detail. The power from the voltage regulator 11 is applied to a primary winding 30 of a transformer 31 connected in series with a start switch 32. A secondary winding 33 on transformer 31 is connected to an array of semiconductor diodes 34 which form a rectifying circuit. A filter choke 36 and a capacitor 37 are used to filter out the high frequency components from the rectified current. The high voltage is applied to one electrode 38 of the laser 13 in series with a limiting resistor 40. The other laser terminal 41 is connected to ground by means of conductor 42.

The laser shown in FIGURE 2 is a gas laser and includes a pump electrode 43 connected in series with the secondary winding 44 of a transformer 45 having a primary winding 46 connected between one side of the secondary winding 33 and a terminal 47 of a second portion of the start switch 32A. Each portion of the start switch 32, 32A, includes a contact arm 48 and 50 and each portion of the switch includes contacts labeled "OFF," "ON," and "START."

The circuit shown in FIGURE 3 includes the filters 16 and 20, the photosensitive transducers 17 and 21, and the detector circuits 18 and 22. Many forms of photoelectric transducers can be used as the local and distant detecting means 21 and 17. If a photoconductive cell is used, a source of potential must be connected in series with the detector units. If photoelectric cells are used a high voltage supply must be connected to each unit and a coupling circuit must be connected between the cells and the adjustable resistors 18 and 22. The transducers shown in FIGURE 3 generate their own voltage and need no additional electric power supply. One terminal of each transducer is connected to a common conductor 49 which is connected to one terminal in the switching means 28. The other transducer conductors 51 and 52 are connected to terminals on switch 27, the switch blade of which is connected in series with a variable resistor 53 to one of the input terminals of the direct current amplifier.

In order to calibrate the apparatus at the start of a measuring interval, switch 28 is provided. The two lower switching terminals are connected to a source of direct current potential 54 and an adjustable voltage divider 55. As shown in FIGURE 3, the source of direct current is a battery but any other form of direct current power may be used such as a rectifier means connected to the alternating current system in connection with a stabilizing means which may be a Zener diode.

The operation of this circuit is as follows: the light source which contains the laser generator is securely mounted on a building or a tower and directed toward a receiving station which may be 500 feet away. The distant detector is mounted in the receiving station and adjusted in position so that it receives maximum light energy from the light generator. This is the operating position and when the components have been calibrated and adjusted, the meter reading shows the percentage of light transmitted over the distance between the generator and the distant detector.

Since the components, especially the photosensitive transducers, have variable characteristics, it is necessary to calibrate the system and adjust certain resistors before the meter reads the percentage of light transmitted. To do this, switches 27 and 28 are both moved to the right hand position (see FIGURE 3) for calibration.

To start the laser 13, power is applied to the system by connecting the AC supply terminals to an AC power line (see FIGURE 2). Next, the switches 32, 32A are operated to move switch arms 48 and 50 to the "ON" position for about 10 seconds. This circuit applies alternating current power to transformer 31 and supplies electrodes 38 and 41 with high voltage direct current power. After a 10 second warm-up period, the switch 32, 32A is moved to the "START" position and the auxiliary electrode 43 is connected to an alternating current power supply by means of transformer 45. The laser will then "fire" and the operator releases the switch lever allowing the arms 48, 50, to return to the "ON" position by resilient means (not shown).

The system is now run for about one hour before the calibration operation. To calibrate, first set switch 27 to its right hand position (FIGURE 3) and adjust resistor 22A until the meter 26 reads 100 on its scale. Next, move switch 27 to the left hand position and place the distant detector 17 directly in front of the laser beam. Adjust resistor 18A to produce a reading of 100 on the meter 26. The distant detector is now put in its proper housing and reconnected to the cable 65 which connects it with the control circuit. It should be noted that the source of direct current 54 and its adjusting resistor 55 are not in the circuit at this time and only one detector at a time can be connected to the amplifier meter for its adjustment. Finally, switches 27 and 28 are both moved to the left and, with both detectors in their proper place and with no fog or atmospheric contamination, resistor 55 is adjusted so that the meter reads 100. The system is now ready for normal operation.

During the normal operation the input circuit of the direct amplifier may be traced from the grounded conductor 66, through variable resistor 53, switch 27 and conductor 52, photosensitive cell 17 where a voltage is added, then over conductor 49, to the other photosensitive cell 21 where a bucking voltage is added. The circuit continues from cell 21 to the upper left hand switch blade of switch 28, the resistor 55 where a third voltage is added, and then through the lower switch blade, conductor 67 and to the other terminal of amplifier 25. When there is no fog, no haze, and the atmosphere is clear, the two voltages added by detectors 17 and 21 cancel each other and the reading of 100 on meter 25 is due entirely to the voltage added by battery 54 and resistor 55. When the distant cell 17 receives less than its normal amount of light, the input voltage is reduced and the meter 26 shows a reading less than 100 to indicate the presence of absorbing particles in the air.

It is believed necessary to check the apparatus at least once a day to be sure that the remote detector in the system has not changed its characteristics to give an error reading. For this reason a motor 57 is added to the system and is connected to the alternating current supply terminals. A gear reduction means 58 is connected to the motor shaft in order to scale down the shaft motion and produce a movement on a second shaft 60 which turns at the speed of one revolution per hour. A cam 61 is secured to shaft 60 and operates a normally closed pair of contacts 62 to open the contacts once a day for a time duration of about 75 seconds. Contacts 62 are connected in series with the line 65 from the distant transducer 17 so that this transducer is completely cut off once a day at which time the meter reading should be zero. A zero meter reading under these conditions means that the voltage across resistor 55 is balanced by an equal voltage produced by the local detector circuit (21, 22).

Most installations of this type will be operated 24 hours per day and the meter 26 will then be replaced by a recording type device which draws a line on a moving strip of paper to indicate the percentage of air pollution or fog at any time and to produce a permanent record. The zero check each day then is of especial importance since it furnishes a permanent check on the sensitive components.

From the foregoing it will be seen that there has also been provided a highly portable device for measuring visibility through the atmosphere. Such a device could be secured at each end of an aircraft to give the pilot a reading on ambient visibility. By extrapolation he could also get visibility over a greater distance. Since the system can be mounted on a plane it can yield useful data concerning slant range visibility wherever the plane is located.

The portable system can be mounted with the laser at the front of a truck and the remote detector at the other end so that readings can be taken as the truck is driven around.

Having thus fully described the invention, what is new and desired to be secured by Letters Patent of the United States, is:

1. An atmospheric measuring system comprising, a laser source of light with focusing means for forming a single substantially parallel beam, a beam splitting means for reflecting a portion of the light beam at an angle for local measurement, a local light sensitive detector positioned adjacent to the source and in the path of the reflected beam of light for determining the local light intensity, a distant light sensitive detector spaced from the source and positioned so as to intercept the light beam after the beam has traversed a portion of the atmosphere for determining the light intensity at the distant location, an adjustable source of direct current potential, electrical connecting means for connecting the local light detector, the distant light detector, and the adjustable source of potential in series with each other, said detectors being poled to provide opposing voltage values when illuminated, and a direct current amplifier having input terminals connected to said detectors and the source of potential, and output terminals connected to an electrical direct current meter for indicating the percentage of light absorption by the atmosphere.

2. A measuring system as claimed in claim 1, wherein a light filter is placed in front of each of said detectors for filtering out ambient light sources and passing only the wave lengths generated by the light source.

3. A measuring system as claimed in claim 1, wherein switching means is provided for connecting each of said light sensitive detectors respectively, to the input terminals of the amplifier for calibration.

4. A measuring system as claimed in claim 1, wherein said light sensitive detectors are photosensitive cells which generate an electrical voltage when light is applied to them.

5. A measuring system as claimed in claim 1, wherein each of said light sensitive cells is coupled to a variable resistor for output voltage adjustment.

6. A measuring system as claimed in claim 1, wherein said light source is a gas laser filled with helium and adjusted to emit light energy having a wave length within the region of .6 and .7 micron.

7. A measuring system as claimed in claim 1 wherein said output terminals are connected to a recording current meter which produces a line on a moving strip of paper.

8. A measuring system as claimed in claim 1 wherein a motor has its shaft coupled to a series switch in the detector circuit and disconnects the distant light sensitive detector from the measuring system at pre-determined time intervals for sending a zero current through the meter and for testing the system.

References Cited

UNITED STATES PATENTS 2,159,181   5/1939   Ryder.
2,424,858   7/1947   Senn.
3,335,285   8/1967   Gally et al.

RICHARD C. QUEISSER, *Primary Examiner.*

JERRY W. MYRACLE, *Assistant Examiner.*

U.S. Cl. X.R.

88—14; 250—220